US006363099B1

(12) United States Patent
Sakoda et al.

(10) Patent No.: US 6,363,099 B1
(45) Date of Patent: Mar. 26, 2002

(54) PHYSICAL CHANNEL ASSIGNMENT METHOD AND TRANSMITTER

(75) Inventors: Kazuyuki Sakoda, Tokyo; Mitsuhiro Suzuki, Chiba, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/247,909

(22) Filed: Feb. 11, 1999

(30) Foreign Application Priority Data

Feb. 25, 1998 (JP) ............................................ 10-043962

(51) Int. Cl.[7] .............................. H04B 1/713; H04J 3/16
(52) U.S. Cl. ...................... 375/131; 375/132; 370/329; 370/335; 370/341; 370/441
(58) Field of Search ................................. 375/132, 131, 375/130, 137; 370/329, 335, 341, 431, 437, 441, 337

(56) References Cited

U.S. PATENT DOCUMENTS

| 4,476,566 A | 10/1984 | Dent ............................... 375/1 |
| 4,998,290 A | 3/1991 | Olenick et al. ................ 455/53 |
| 5,581,548 A | 12/1996 | Ugland et al. .............. 370/330 |
| 6,005,852 A * | 12/1999 | Kokko et al. ................ 370/329 |
| 6,173,004 B1 * | 1/2001 | Ohashi ......................... 375/132 |
| 6,215,810 B1 * | 4/2001 | Park ............................. 375/131 |
| 6,240,099 B1 * | 5/2001 | Lim et al. .................... 370/441 |
| 6,240,126 B1 * | 5/2001 | Ohashi et al. .............. 375/132 |

FOREIGN PATENT DOCUMENTS

| EP | 0564339 | 10/1993 | ............. H04J/3/16 |
| WO | 9602979 | 2/1996 | ........... H04B/1/713 |

* cited by examiner

*Primary Examiner*—Chi Pham
*Assistant Examiner*—Dung X. Nguyen
(74) *Attorney, Agent, or Firm*—Jay H. Maioli

(57) ABSTRACT

A physical channel assignment method prevents the same logical channels from being always adjacent to each other on a frequency axis so that any interference between the adjacent channels can be averaged. By using the values of first pseudo-noise codes as the channel numbers and assigning the physical channels (f1 to f7) to the first logical channel (#1); obtaining second pseudo-noise codes whose phases are shifted from those of the first pseudo-noise codes; and using the values of the second pseudo-noise codes as the channel numbers and assigning the physical channels (f1 to f7) to the second logical channel(#2), the first and second logical channels (#1, #2) can be prevented from being always adjacent to each other on the frequency axis.

9 Claims, 16 Drawing Sheets

| TIME SLOT | RANDOM NUMBER VALUE VR | MS0 Vo=0 #0 | MS1 Vo=1 #1 | MS2 Vo=2 #2 | MS3 Vo=3 #3 | MS4 Vo=4 #4 | MS5 Vo=5 #5 | MS6 Vo=6 #6 | MS7 Vo=7 #7 |
|---|---|---|---|---|---|---|---|---|---|
| T0 | 0 | f0 | f1 | f2 | f3 | f4 | f5 | f6 | f7 |
| T1 | 3 | f3 | f4 | f5 | f6 | f7 | f0 | f1 | f2 |
| T2 | 5 | f5 | f6 | f7 | f0 | f1 | f2 | f3 | f4 |
| T3 | 7 | f7 | f0 | f1 | f2 | f3 | f4 | f5 | f6 |
| T4 | 2 | f2 | f3 | f4 | f5 | f6 | f7 | f0 | f1 |
| T5 | 1 | f1 | f2 | f3 | f4 | f5 | f6 | f7 | f0 |
|  |  |  |  |  |  |  |  |  |  |

FIG. 3 (RELATED ART)

|  | f0 | f1 | f2 | f3 | f4 | f5 | f6 | f7 |
|---|---|---|---|---|---|---|---|---|
| T0 | #0 (MS0) | #1 (MS1) | #2 (MS2) | #3 (MS3) | #4 (MS4) | #5 (MS5) | #6 (MS6) | #7 (MS7) |
| T1 | #5 (MS5) | #6 (MS6) | #7 (MS7) | #0 (MS0) | #1 (MS1) | #2 (MS2) | #3 (MS3) | #4 (MS4) |
| T2 | #3 (MS3) | #4 (MS4) | #5 (MS5) | #6 (MS6) | #7 (MS7) | #0 (MS0) | #1 (MS1) | #2 (MS2) |
| T3 | #1 (MS1) | #2 (MS2) | #3 (MS3) | #4 (MS4) | #5 (MS5) | #6 (MS6) | #7 (MS7) | #0 (MS0) |
| T4 | #6 (MS6) | #7 (MS7) | #0 (MS0) | #1 (MS1) | #2 (MS2) | #3 (MS3) | #4 (MS4) | #5 (MS5) |
| T5 | #7 (MS7) | #0 (MS0) | #1 (MS1) | #2 (MS2) | #3 (MS3) | #4 (MS4) | #5 (MS5) | #6 (MS6) |

|    | T0 | T1 | T2 | T3 | T4 | T5 | T6 | T7 | ••• |
|----|----|----|----|----|----|----|----|----|-----|
| #1 | f1 | f4 | f6 | f7 | f3 | f5 | f2 | f1 | ••• |
| #2 | f4 | f6 | f7 | f3 | f5 | f2 | f1 | f4 | ••• |
| #3 | f6 | f7 | f3 | f5 | f2 | f1 | f4 | f6 | ••• |
| #4 | f7 | f3 | f5 | f2 | f1 | f4 | f6 | f7 | ••• |
| #5 | f3 | f5 | f2 | f1 | f4 | f6 | f7 | f3 | ••• |
| #6 | f5 | f2 | f1 | f4 | f6 | f7 | f3 | f5 | ••• |
| #7 | f2 | f1 | f4 | f6 | f7 | f3 | f5 | f2 | ••• |

| | f1 | f2 | f3 | f4 | f5 | f6 | f7 | → FREQUENCY |
|---|---|---|---|---|---|---|---|---|
| T0 | #1 | #7 | #5 | #2 | #6 | #3 | #4 | |
| T1 | #7 | #6 | #4 | #1 | #5 | #2 | #3 | |
| T2 | #6 | #5 | #3 | #7 | #4 | #1 | #2 | |
| T3 | #5 | #4 | #2 | #6 | #3 | #7 | #1 | |
| T4 | #4 | #3 | #1 | #5 | #2 | #6 | #7 | |
| T5 | #3 | #2 | #7 | #4 | #1 | #5 | #6 | |
| T6 | #2 | #1 | #6 | #3 | #7 | #4 | #5 | |
| T7 | #1 | #7 | #5 | #2 | #6 | #3 | #4 | |

TIME

| LOGICAL CHANNEL | LOGICAL SUBCHANNEL |
|---|---|
| ##1 | #1→#4→#6→#7→#3→#5→#2→#1→··· |
| ##2 | #4→#6→#7→#3→#5→#2→#1→#4→··· |
| ##3 | #6→#7→#3→#5→#2→#1→#4→#6→··· |
| ##4 | #7→#3→#5→#2→#1→#4→#6→#7→··· |
| ##5 | #3→#5→#2→#1→#4→#6→#7→#3→··· |
| ##6 | #5→#2→#1→#4→#6→#7→#3→#5→··· |
| ##7 | #2→#1→#4→#6→#7→#3→#5→#2→··· |

FIG. 17

| # | 1 | 2 | 3 | 4 | 5 | 6 | 7 | 8 | 9 | 10 | 11 | 12 | 13 | 14 | 15 | 16 |
|---|---|---|---|---|---|---|---|---|---|----|----|----|----|----|----|----|
| L1 | 1 | | | | 2 | | | | 3 | | | | 4 | | | |
| L2 | 1 | 2 | 3 | 4 | 1 | 2 | 3 | 4 | 1 | 2 | 3 | 4 | 1 | 2 | 3 | 4 |

FIG. 18

| f | 1 | 2 | 3 | 4 | 5 | 6 | 7 | 8 | 9 | 10 | 11 | 12 | 13 | 14 | 15 | 16 |
|---|---|---|---|---|---|---|---|---|---|----|----|----|----|----|----|----|
| G1 | 1 | | | | 2 | | | | 3 | | | | 4 | | | |
| G2 | 1 | 2 | 3 | 4 | 1 | 2 | 3 | 4 | 1 | 2 | 3 | 4 | 1 | 2 | 3 | 4 |

FIG. 19

| L1 \ Index | 0 | 1 | 2 | 3 |
|---|---|---|---|---|
| 1 | 4 | 3 | 1 | 2 |
| 2 | 1 | 2 | 4 | 3 |
| 3 | 2 | 4 | 3 | 1 |
| 4 | 3 | 1 | 2 | 4 |

FIG. 20A

| L2 \ Index | 0 | 1 | 2 | 3 |
|---|---|---|---|---|
| 1 | 4 | 3 | 1 | 2 |
| 2 | 1 | 2 | 4 | 3 |
| 3 | 2 | 4 | 3 | 1 |
| 4 | 3 | 1 | 2 | 4 |

FIG. 20B

| LOGOCAL CHANNEL | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| L1 | 1 | | | | 2 | | | | 3 | | | | 4 | | | |
| L2 | 1 | 2 | 3 | 4 | 1 | 2 | 3 | 4 | 1 | 2 | 3 | 4 | 1 | 2 | 3 | 4 |
| g1=0 → INDEX NUMBER OF TB1 AND TB2=0 | | | | | | | | | | | | | | | | |
| G1/G2 | 4/4 | 4/1 | 4/2 | 4/3 | 1/4 | 1/1 | 1/2 | 1/3 | 2/4 | 2/1 | 2/2 | 2/3 | 3/4 | 3/1 | 3/2 | 3/3 |
| FREQUENCY CHANNEL | 16 | 13 | 14 | 15 | 4 | 1 | 2 | 3 | 8 | 5 | 6 | 7 | 12 | 9 | 10 | 11 |

| LOGICAL CHANNEL | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| L1 | 1 | | | | 2 | | | | 3 | | | | 4 | | | |
| L2 | 1 | 2 | 3 | 4 | 1 | 2 | 3 | 4 | 1 | 2 | 3 | 4 | – | – | – | – |
| | g1=0 → INDEX NUMBER OF TB1 AND TB2 =0 | | | | | | | | | | | | | | | |
| G1/G2 | 4/4 | 4/1 | 4/2 | 4/3 | 1/4 | 1/1 | 1/2 | 1/3 | 2/4 | 2/1 | 2/2 | 2/3 | 3 | | | |
| FREQUENCY CHANNEL | 16 | 13 | 14 | 15 | 4 | 1 | 2 | 3 | 8 | 5 | 6 | 7 | 9~12 | | | |
FIG. 23
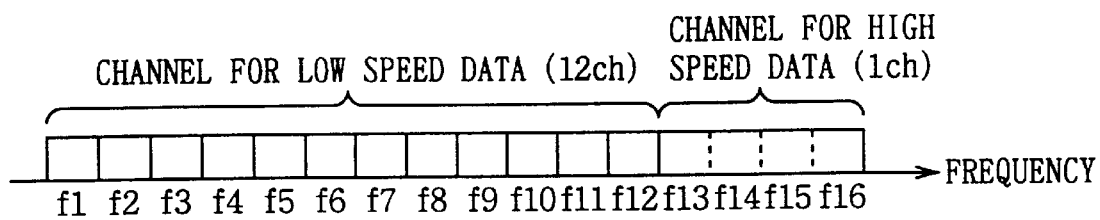
FIG. 24A
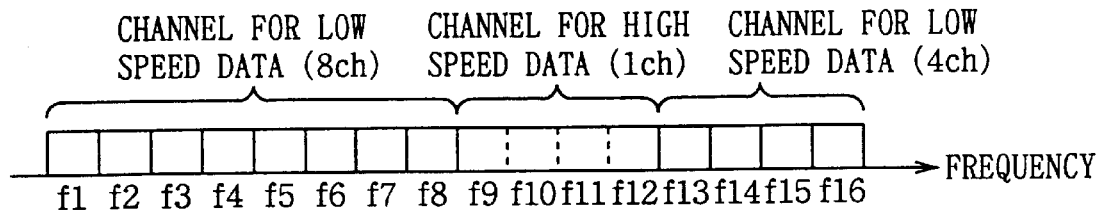
FIG. 24B

|   | Index |   |   |   |
|---|---|---|---|---|
|   | 0 | 1 | 2 | 3 |
| L1  1 | 4 | 3 | 1 | 2 |
| 2 | 1 | 2 | 4 | 3 |
| 3 | 2 | 4 | 3 | 1 |
| 4 | 3 | 1 | 2 | 4 |

( ) CHANGE OF CHANNEL

FIG. 25

|   | Index |   |
|---|---|---|
|   | 0 | 1 |
| L1 OR L2  1 | 1 | 2 |
| 2 | 2 | 1 |

FIG. 26

|   | Index |   |   |
|---|---|---|---|
|   | 0 | 1 | 2 |
| L1 OR L2  1 | 1 | 2 | 3 |
| 2 | 2 | 3 | 1 |
| 3 | 3 | 1 | 2 |

Index

|   | 0 | 1 | 2 | 3 | 4 | 5 | 6 |
|---|---|---|---|---|---|---|---|
| 1 | 1 | 4 | 6 | 7 | 3 | 5 | 2 |
| 2 | 4 | 6 | 7 | 3 | 5 | 2 | 1 |
| 3 | 6 | 7 | 3 | 5 | 2 | 1 | 4 |
| 4 | 7 | 3 | 5 | 2 | 1 | 4 | 6 |
| 5 | 3 | 5 | 2 | 1 | 4 | 6 | 7 |
| 6 | 5 | 2 | 1 | 4 | 6 | 7 | 3 |
| 7 | 2 | 1 | 4 | 6 | 7 | 3 | 5 |

L1 OR L2 (rows)

FIG. 29

Index

|   | 0 | 1 | 2 | 3 | 4 | 5 | 6 | 7 |
|---|---|---|---|---|---|---|---|---|
| 1 | 1 | 4 | 8 | 6 | 7 | 3 | 5 | 2 |
| 2 | 4 | 8 | 6 | 7 | 3 | 5 | 2 | 1 |
| 3 | 8 | 6 | 7 | 3 | 5 | 2 | 1 | 4 |
| 4 | 6 | 7 | 3 | 5 | 2 | 1 | 4 | 8 |
| 5 | 7 | 3 | 5 | 2 | 1 | 4 | 8 | 6 |
| 6 | 3 | 5 | 2 | 1 | 4 | 8 | 6 | 7 |
| 7 | 5 | 2 | 1 | 4 | 8 | 6 | 7 | 3 |
| 8 | 2 | 1 | 4 | 8 | 6 | 7 | 3 | 5 |

L1 OR L2 (rows)

|    | \multicolumn{15}{c}{Index} | | | | | | | | | | | | | | |
|----|---|---|---|---|---|---|---|---|---|---|---|---|---|---|---|
|    | 0 | 1 | 2 | 3 | 4 | 5 | 6 | 7 | 8 | 9 | 10 | 11 | 12 | 13 | 14 |
| 1  | 1 | 8 | 12 | 14 | 15 | 7 | 11 | 5 | 10 | 13 | 6 | 3 | 9 | 4 | 2 |
| 2  | 8 | 12 | 14 | 15 | 7 | 11 | 5 | 10 | 13 | 6 | 3 | 9 | 4 | 2 | 1 |
| 3  | 12 | 14 | 15 | 7 | 11 | 5 | 10 | 13 | 6 | 3 | 9 | 4 | 2 | 1 | 8 |
| 4  | 14 | 15 | 7 | 11 | 5 | 10 | 13 | 6 | 3 | 9 | 4 | 2 | 1 | 8 | 12 |
| 5  | 15 | 7 | 11 | 5 | 10 | 13 | 6 | 3 | 9 | 4 | 2 | 1 | 8 | 12 | 14 |
| 6  | 7 | 11 | 5 | 10 | 13 | 6 | 3 | 9 | 4 | 2 | 1 | 8 | 12 | 14 | 15 |
| 7  | 11 | 5 | 10 | 13 | 6 | 3 | 9 | 4 | 2 | 1 | 8 | 12 | 14 | 15 | 7 |
| 8  | 5 | 10 | 13 | 6 | 3 | 9 | 4 | 2 | 1 | 8 | 12 | 14 | 15 | 7 | 11 |
| 9  | 10 | 13 | 6 | 3 | 9 | 4 | 2 | 1 | 8 | 12 | 14 | 15 | 7 | 11 | 5 |
| 10 | 13 | 6 | 3 | 9 | 4 | 2 | 1 | 8 | 12 | 14 | 15 | 7 | 11 | 5 | 10 |
| 11 | 6 | 3 | 9 | 4 | 2 | 1 | 8 | 12 | 14 | 15 | 7 | 11 | 5 | 10 | 13 |
| 12 | 3 | 9 | 4 | 2 | 1 | 8 | 12 | 14 | 15 | 7 | 11 | 5 | 10 | 13 | 6 |
| 13 | 9 | 4 | 2 | 1 | 8 | 12 | 14 | 15 | 7 | 11 | 5 | 10 | 13 | 6 | 3 |
| 14 | 4 | 2 | 1 | 8 | 12 | 14 | 15 | 7 | 11 | 5 | 10 | 13 | 6 | 3 | 9 |
| 15 | 2 | 1 | 8 | 12 | 14 | 15 | 7 | 11 | 5 | 10 | 13 | 6 | 3 | 9 | 4 |

PHYSICAL CHANNEL ASSIGNMENT METHOD AND TRANSMITTER

BACKGROUND OF THE INVENTION

1. Field of the Invention

The present invention relates to a physical channel assignment method and a transmitter, and more particularly, is preferably applicable to a cellular radiocommunication system such as a portable telephone system.

2. Description of the Related Art

In the cellular radiocommunication system, an area for providing a communication service has been divided into cells with desired size. A base station has been provided as a fixed station in each of the cells and a communication terminal unit as a mobile station has been designed to perform a radiocommunication with the base station whose communication state seems to be most desirable.

There have been proposed various types of systems as a communication system between the communication terminal unit and the base station. A representative communication system is called a frequency hopping scheme. With this frequency hopping scheme, assuming that, for instance, eight frequency channels f0 to f7 are prepared for communication from the base station to the communication terminal unit, as shown in FIG. 1, the frequency channels used at the time of communication are sequentially changed in terms of time. For example, as shown in FIG. 1, the frequency channels employed are sequentially changed in such a manner that a frequency channel f3 is used in an interval (called a time slot T0, hereinafter) from time t0 to time t1, a frequency channel f1 is used in an interval of time t1 to time t2 (namely, a time slot T1), a frequency channel f5 is used in an interval of time t2 to time t3 (that is to say, a time slot T2) and a frequency channel 2 is used in an interval of time t3 to time t4 (namely, a time slot T3). Since the frequency channels are changed as described above in terms of time, even if an interference wave exists in a certain frequency channel, the influence of an interference only on the same channel can be reduced, because that the frequency channel is not always used.

In such a frequency hopping scheme, a frequency channel determined by a physical parameter such as frequency is looked up as a physical channel. A channel formed by successively combining the frequency channels in terms of time, in other words, a channel formed by the frequency channels f3, f1, f5, f2, ... in an example shown in FIG. 1, is called a logical channel. In this case, if there are, for instance, eight frequency channels, the number of frequency channels available for each time slot may be eight. Therefore, when the frequency channels are combined together in terms of time, eight logical channels may be also formed. Consequently, even in accordance with the frequency hopping system, if there exist eight frequency channels, the eight logical channels can be formed and eight communications can be carried out simultaneously.

Here, it is assumed that the eight frequency channels f0 to f7 are prepared for communication from the base station to the communication terminal unit. Further, as shown in FIG. 2, it is assumed that eight communication terminal units MS0 to MS7 are present in the service area of an arbitrary base station BS1 and the base station BS1 performs a communication with the eight communication terminal units MS0 to MS7 by using logical channels #0 to #7 formed based on the frequency hopping scheme.

Under these conditions, in the conventional base station, the frequency channels f0 to f7 are respectively assigned to the eight logical channels #0 to #7 in accordance with a method described below.

That is to say, the base station has an offset value $V_0$ peculiar to each of the communication terminal units. The frequency channels of the channel numbers fN obtained as a result of a remainder computation as shown in the following Equation are assigned to the respective logical channels #0 to #7 based on the offset value $V_0$ and a random number value $V_R$ changing with time generated in a prescribed random number generator.

$$fN = (V_0 + V_R) \bmod 8 \quad (1)$$

Where, mod indicates a remainder computation. Further specifically, as shown in FIG. 3, it is assumed that the offset values $V_0$ assigned to the communication terminal units MS0 to MS7 are respectively 0, 1, 2, 3, 4, 5, 6 and 7, and the random number values $V_R$ are 0, 3, 5, 7, 2, 1, ..., the frequency channels f0, f3, f5, f7, f2, f1, ... are assigned to the logical channel #0 used for the communication with the communication terminal unit MS0 based on the above described Equation (1). The frequency channels f1, f4, f6, f0, f3, f2, ... are assigned to the logical channels #1 used for the communication with the communication terminal unit MS1.

The frequency channels f0 to f7 are assigned to the logical channels #0 to #7 in accordance with the above method, hence the frequency channels can be assigned to the logical channels #0 to #7 so that the same frequency channels are not employed at the same time.

In the above mentioned conventional channel assignment, however, although the different frequency channels f0 to f7 are respectively assigned to the logical channels #0 to #7 at the same time, there exists an inconvenience that the same logical channels are always assigned to the adjacent frequency channels. For instance, when the channel assignment shown in FIG. 3 is represented again by providing the frequency channels on the abscissa axis, this channel assignment can be changed to one as illustrated in FIG. 4. As can be seen from FIG. 4, the logical channels #0 and #2 are always assigned to the frequency channels adjacent to the frequency channel #1 to which the logical channel #1 is assigned. In such a way, if the same logical channels are always located at adjacent positions on a frequency axis, they always undergo an interference wave of the same level (this is called an adjacent channel interference wave) from the adjacent logical channels. As a result, there arises a problem that an interference with adjacent channels is always fixed.

As mentioned above, when the interference with adjacent channels is fixed, this causes a serious problem particularly when transmitted power is controlled. Usually, in the cellular radiocommunication system, parties of communication mutually monitor the received power of a signal sent from one party to the other party and inform him of the monitored result so that the transmitted power is controlled. Accordingly, in the cellular radiocommunication system, the communication can be always performed with minimum transmitted power as required. When the transmitted power is controlled in such a manner, the transmitted power differs every communication (namely, for each of logical channels).

The power state of the logical channels at prescribed time under the control of the transmitted power is illustrated in FIG. 5. As shown in FIG. 5, when the power of the logical channel #1 is low and the power of the logical channels #0 and #2 located at the adjacent positions thereto in terms of frequency is high, the adjacent channel interference waves to the logical channel #1 from the logical channels #0 and #2 are increased because the power of the logical channels #0 and #2 is high under this state. As a result, there arises a risk that a communication cannot be performed through the logical channel #1 because a signal component sent originally from the logical channel #1 is buried in the adjacent channel interference waves. This phenomenon is not generated only at a prescribed time and may be generated at all timings when the same logical channels are always located at the adjacent positions as mentioned above.

According to the conventional channel assignment method as described, since the same logical channels are always located at the adjacent positions, the adjacent channel interference wave is fixed. Consequently, in the worst case, an inconvenience may occur that it is impossible to perform a communication.

SUMMARY OF THE INVENTION

In view of the foregoing, an object of this invention is to provide a physical channel assignment method capable of preventing the same logical channels from being always located at the adjacent positions and of averaging an adjacent channel interference and a transmitter for transmitting a signal through logical channels assigned with the method.

The foregoing object and other objects of the invention have been achieved by the provision of a physical channel assignment method upon forming logical channels based on a frequency hopping scheme by combining sequentially physical channels composed of frequency channels in terms of time; the method comprising the steps of: generating first pseudo-noise codes having a prescribed cycle; using the values of the first pseudo-noise codes as the channel numbers of the physical channels and assigning the physical channels respectively to the first logical channel; obtaining second pseudo-noise codes whose phases are shifted from those of the first pseudo-noise codes; and using the values of the second pseudo-noise codes as the channel numbers of the physical channels and assigning the physical channels respectively to the second logical channel.

As described above, the values of the first pseudo-noise codes are used as the channel numbers of the physical channels and the physical channels are respectively assigned to the first logical channel; second pseudo-noise codes whose phases are shifted from those of the first pseudo-noise codes are obtained and the values of the second pseudo-noise codes are used as the channel numbers of the physical channels and the physical channels are respectively assigned to the second logical channel. Thus, the first and second logical channels can be prevented from being always located at the adjacent positions to each other on a frequency axis. Since the first and second logical channels can be prevented from being always adjacent to each other, the same adjacent channel interference can be prevented from being always supplied from the same logical channel, and the adjacent channel interference can be averaged.

Further, according to another aspect of the present invention, there is provided a physical channel assignment method upon forming logical channels based on a frequency hopping mode by combining sequentially physical channels composed of frequency channels in terms of time, the method comprising the steps of previously providing a channel assignment table on which an interference with adjacent channels is uniformly distributed; and using values looked up from the channel assignment table as the channel numbers of the physical channels and assigning the physical channels respectively to the plurality of logical channels.

As described above, the channel assignment table on which an interference with adjacent channels is uniformly distributed is previously prepared and values looked up from the channel assignment table are used as the channel numbers of the physical channels and the physical channels are assigned respectively to the plurality of logical channels. Thus, the same logical channels can be prevented from being always located at the adjacent positions to each other on a frequency axis with a relatively simple configuration, so that the adjacent channel interference can be averaged.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 3 is a chart used for explaining a conventional channel assignment to logical channels;

FIG. 17 is a chart employed for explaining the assignment of logical subchannels relative to logical channels in the second embodiment;

FIG. 18 is a chart employed for explaining the hierarchical expression of logical channels according to a third embodiment;

FIG. 19 is a chart employed for explaining the hierarchical expression of frequency channels according to the third embodiment;

FIGS. 20A and 20B show channel assignment tables employed in the third embodiment;

FIG. 23 is a chart used for explaining the assignment of the frequency channels when channels for transmitting high speed data are formed;

FIGS. 24A and 24B are schematic diagrammatic views used for explaining an operation for replacing the channels for transmitting the high speed data by channels;

FIG. 25 is a schematic diagrammatic view for explaining the replacement of the data of the channel assignment table by data;

FIG. 26 is a schematic diagrammatic view showing a secondary channel assignment table;

FIG. 27 is a schematic diagrammatic view showing a tertiary channel assignment table;

FIG. 28 is a schematic diagrammatic view showing a seventh channel assignment table;

FIG. 29 is a schematic diagrammatic view showing a eighth channel assignment table; and FIG. 30 is a schematic diagrammatic view showing a fifteenth channel assignment table.

DETAILED DESCRIPTION OF THE EMBODIMENTS

Figure 1:
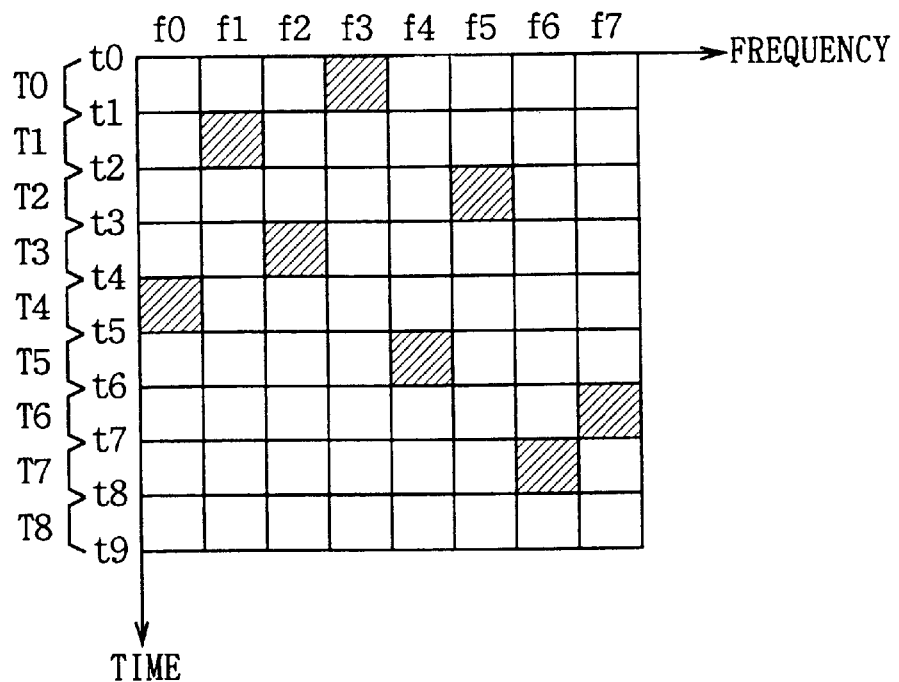
FIG. 1 is a schematic diagrammatic view employed for explaining the principle of a frequency hopping scheme.
Figure 2:
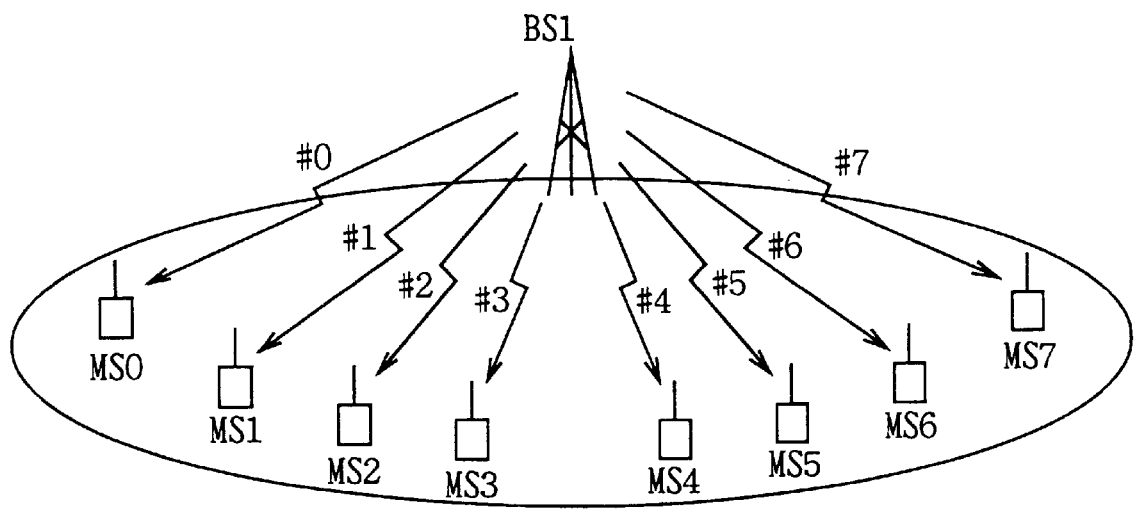
FIG. 2 is a schematic diagrammatic view for explaining a communication using eight logical channels formed based on the frequency hopping scheme.
Figures 4, 5:
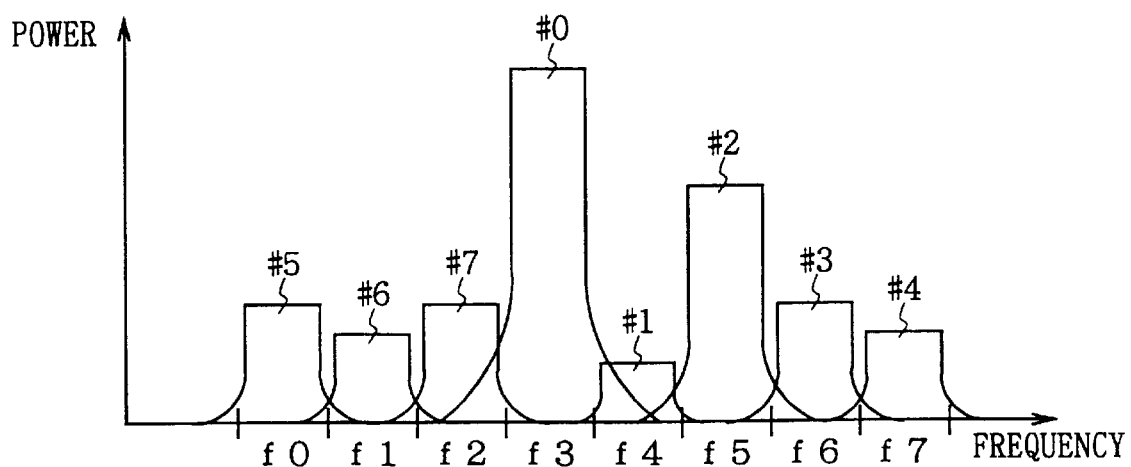
FIG. 4 is a schematic diagrammatic view used for explaining the logical channels assigned by a conventional method represented on a frequency axis.
FIG. 5 is a schematic diagrammatic view used for explaining an influence by an adjacent channel interference.
Figure 6:
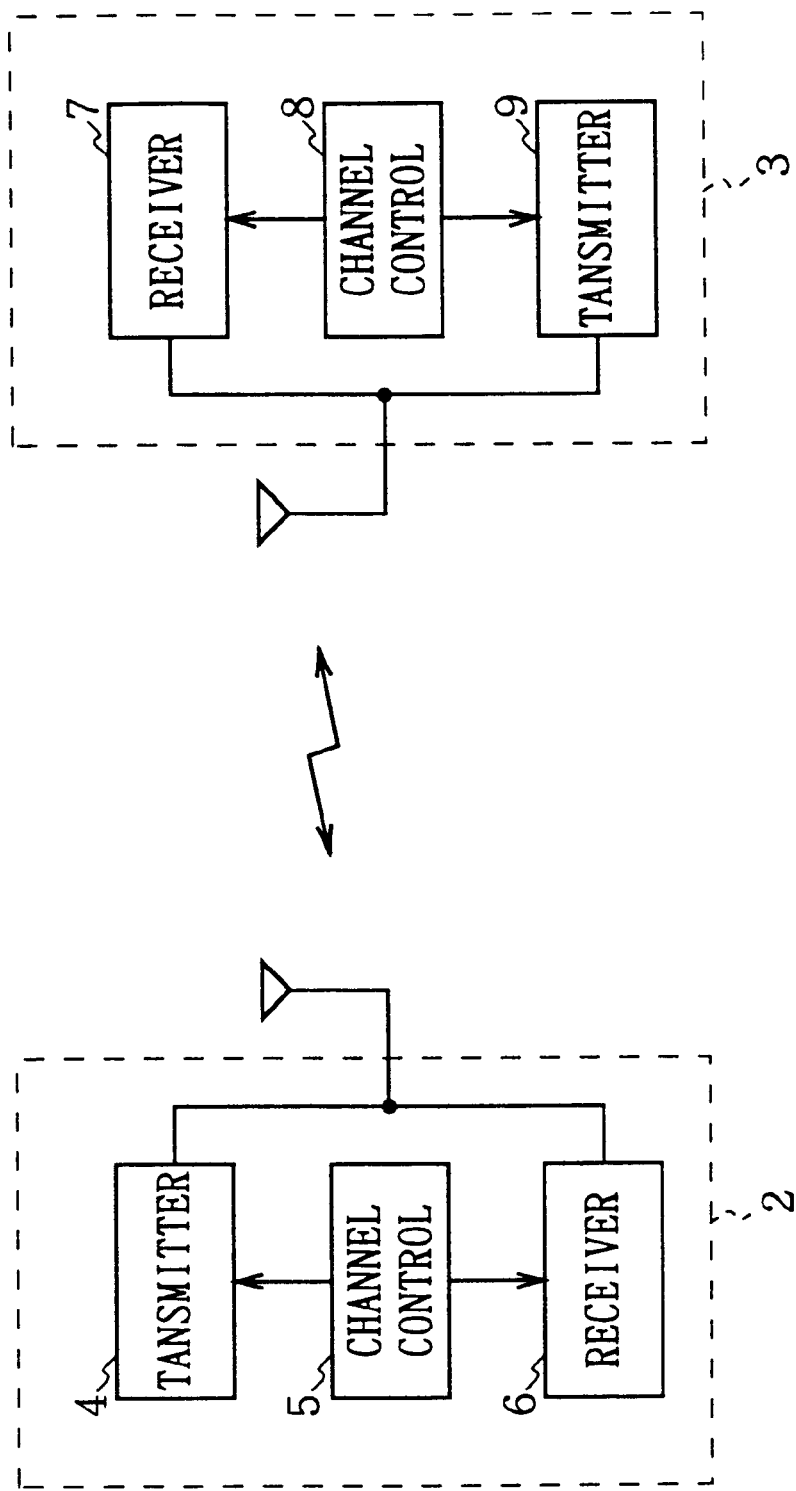
FIG. 6 is a block diagram showing a basic configuration of a cellular radiocommunication system to which the present invention is applied.

Preferred embodiments of this invention will be described with reference to the accompanying drawings:

(1) First Embodiment (1-1) Entire Configuration of Cellular Radiocommunication System Referring to FIG. 6, reference numeral 1 generally designates a cellular radiocommunication system to which the present invention is applied. The cellular radiocommunication system serves to perform a communication by connecting a base station 2 to a communication terminal unit 3 through a radio line. In this case, the base station 2 includes a transmitter 4, a channel control part 5 and a receiver 6. Further, the communication terminal unit 3 also includes a receiver 7, a channel control part 8 and a transmitter 9. The base station 2 and the communication terminal unit 3 perform a communication therebetween using these circuit blocks.

The transmitter 4 of the base station 2 gives a prescribed modulation process to data to be transmitted. The transmitter transmits a transmitting signal obtained as a result through frequency channels instructed by channel information sent from the channel control part 5. At this time, the channel control part 5 is designed to sequentially change in terms of time the frequency channels instructed relative to the transmitter 4, so that the transmitter 4 transmits the transmitting signal based on a frequency hopping scheme. Further, the receiver receives the channel information of frequency channels used by the communication terminal unit 3 for its transmission from the channel control part 5. The receiver receives the frequency channels instructed by the channel information so that it receives a transmitting signal sent from the communication terminal unit 3. Then, the receiver gives a prescribed demodulation process to a received signal thus obtained to restore the data transmitted by the communication terminal unit 3.

On the other hand, the receiver 7 of the communication terminal unit 3 receives from the channel control part 8 the channel information of the frequency channels used for the transmitting signal sent from the base station 2. The receiver receives the frequency channels instructed by the channel information so that it receives the transmitting signal from the base station 2. The receiver applies a prescribed demodulation process to a received signal obtained as a result to restore the data transmitted by the base station 2. Further, the transmitter 9 gives a prescribed modulation process to data to be transmitted and transmits a transmitting signal obtained as a result through frequency channels instructed by channel information sent from the channel control part 8. In this connection, the channel control part 8 is also designed to sequentially change in terms of time the frequency channels instructed relative to the transmitter 9, so that the transmitter 9 transmits the transmitting signal based on a frequency hopping scheme.

Here, although the above explanation is given based on an assumption that one transmitter 4 and one receiver 6 are respectively provided in the base station 2, a plurality of the same transmitters 4 and receivers 6 are actually provided in the base station 2. Therefore, the plurality of transmitters and receivers are employed so that communication can be simultaneously carried out between a plurality of communication terminal units 3 and them. Parenthetically, if the number of frequency channels which are assigned to the radiocommunication between the base station 2 and the communication terminal units 3 is N, N pieces of transmitters and receivers will be provided in the base station 2, so that the base station can perform simultaneous communications with the N pieces of communication terminal units at maximum.

Now, the configurations of the transmitters 4 and 9 and the receivers 6 and 7 which are respectively provided in the base station 2 and the communication terminal unit 3 will be specifically described. In this case, since the configuration of the transmitter 4 is the same as that of the transmitter 9 and the configurations of the receivers 6 and 7 are identical with each other, the transmitter 4 of the base station 2 and the receiver 7 of the communication terminal unit 3 will be only described hereinbelow.

Figure 7:
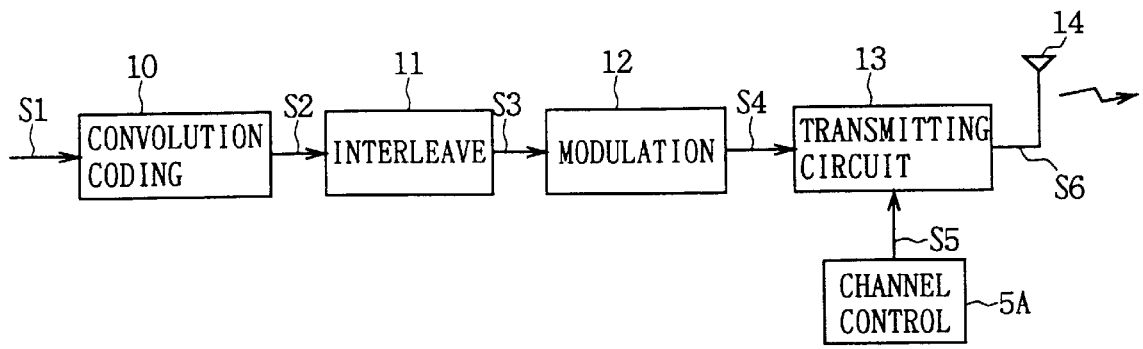
FIG. 7 is a block diagram showing the configuration of a transmitter provided in a base station.
Figure 8:
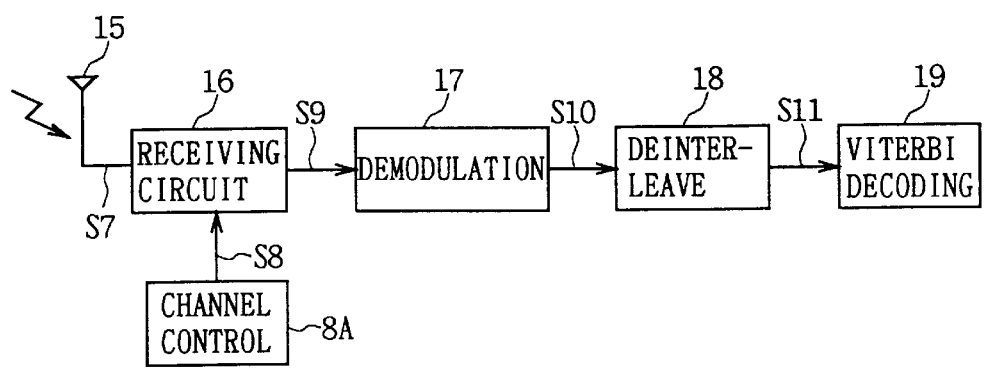
FIG. 8 is a block diagram showing the configuration of a receiver provided in a communication terminal unit.

In the transmitter 4, as shown in FIG. 7, transmitting data S1 which is data to be transmitted is initially inputted to a convolution coding circuit 10. The convolution coding circuit 10 comprises a prescribed number of stages of shift registers and an exclusive OR circuit and gives a convolution coding process to the transmitting data S1 which is inputted thereto and outputs transmitting data S2 thus obtained to an interleave circuit 11. The interleave circuit 11 stores the transmitting data S2 in a regular order in a storage area. When the transmitting data S2 is stored in the whole parts of the storage area, the interleave circuit reads out the transmitting data S2 in an order different from a writing order, so that it rearranges the order of the transmitting data 52 and outputs transmitting data S3 obtained as a result to a modulation circuit 12.

The modulation circuit 12 applies a prescribed modulation process such as a QPSK (Quadrature Phase Shift Keying) modulation to the transmitting data S3 so that it generates a transmitting signal S4 and outputs this signal to a transmitting circuit 13. The transmitting circuit 13 converts the transmitting signal S4 into a transmitting signal S6 of a prescribed band and transmits the signal through an antenna 14. In this case, the transmitting circuit 13 is designed to convert the transmitting signal S4 into the transmitting signal S6 of the band of frequency channels designated by channel information S5 based on the channel information S5 noticed from a channel control part 5A (here, a part of the channel control part 5 which performs a channel control in a transmitting side shown in FIG. 6 is referred to as a channel control part 5A).

In this connection, the channel control part 5A is designed to sequentially change in terms of time frequency channels which are instructed to the transmitting circuit 13 so that the transmitting circuit 13 performs a transmission based on a frequency hopping scheme. The channel control part 5A controls a plurality of logical channels formed with the frequency channels which change sequentially in terms of time and instructs the frequency channels 11 forming the logical channels assigned to the transmitter 4 to the transmitting circuit 13 based on the channel information S5.

As compared therewith, in the receiver 7, as shown in FIG. 3, a received signal S7 received by an antenna 15 is first inputted to a receiving circuit 16. The receiving circuit 16 takes out the signal components of frequency channels designated by channel information S8 from the received signal S7 based on the channel information S8 supplied from a channel control part 8A (here, a part of the channel control part 8 shown in FIG. 6 which performs a channel control in a receiving side shown in FIG. 6 is referred to as a channel control part 8A). Then, the receiving circuit gives a frequency conversion to the signal components to form a baseband signal S9 and outputs the signal to a demodulation circuit 17. In this case, the channel control part has a configuration similar to that of the channel control part 5A in the transmitting side. The channel control part controls a plurality of logical channels formed with frequency channels which change sequentially in terms of time and instructs the frequency channels of the logical channels for a transmission used by the transmitter 4 to the receiving circuit 16 based on the channel information S8. Therefore, when the signal components of the frequency channels instructed by the channel information S8 are taken out in the receiving circuit 16, the signal components of the transmitting signal S6 sent from the transmitter 4 can be taken out. The demodulation circuit 17 applies a demodulation process which corresponds to the modulation process carried out in the transmitting side to the baseband signal S9 to restore received data S10 and outputs the data to a deinterleave circuit 18. The deinterleave circuit 18 is a circuit block which serves to return the data rearranged in the transmitting side to original data. The-deinterleave circuit stores the received data S10 sequentially in a storage area. When the received data S10 is stored in all the parts of the storage area, the deinterleave circuit reads out the received data S10 in a prescribed order to generate received data S11 whose arrangement order is returned to an original arrangement order and outputs the data to a Viterbi decoding circuit 19.

The Viterbi decoding circuit 19 considers the trellis of a convolution code based on the received data S11 inputted and estimates the most probable state (what is called a maximum series estimation) among all state transitions available for data, hence the decoding circuit restores received data S12. In such a way, the received data S12 which represents the data sent from the transmitter 4 is restored under the decoding process of the Viterbi decoding circuit 19.

(1-2) Configuration of Channel Control Part

Subsequently, in this paragraph, the channel control parts 5A and 8A will be specifically described. Since the configurations of the channel control parts 5A and 8A are identical with each other, the channel control part 5A will be only described hereinafter. Further, in order to readily understand the explanation, it is assumed that seven frequency channels f1 to f7 are prepared for a radiocommunication from the base station 2 to the communication terminal unit 3, the seven frequency channels f1 to f7 are combined together while they are sequentially changed in terms of time to form seven logical channels #1 to #7 and the radiocommunication from the base station 2 to the communication terminal unit 3 is carried out by using one of the logical channels.

Figures 9, 10:
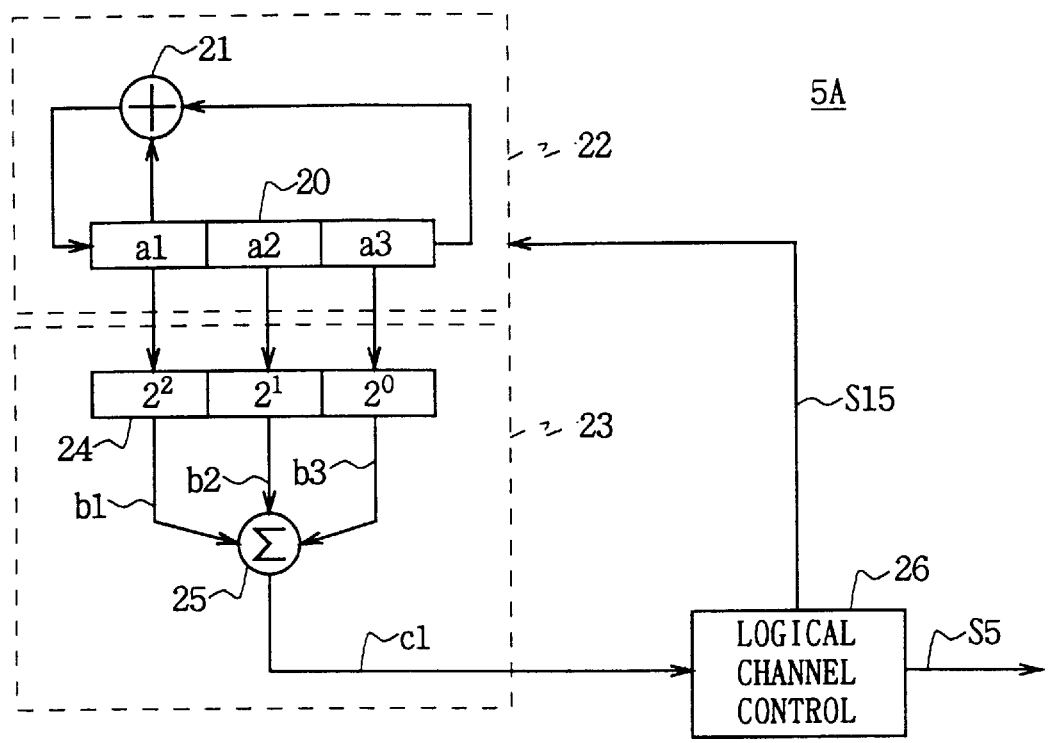
FIG. 9 is a block diagram showing the configuration of a channel control part.
FIG. 10 is a chart showing an M series code generated by the M series code generator of the channel control part.

As shown in FIG. 9, the channel control part 5A has an M series code generator 22 having three-stage shift register 20 and an exclusive OR circuit 21. The M series code generator 22 performs an exclusive OR computation of the value of the first stage register and the value of the third stage shift register and inputs sequentially the computation results to the first stage register. Thus, the M series codes of three bits composed of values a1 to a3 are generated. In the M series code generator 22, the shift register 20 comprises three stages, so that the cycle of the generated M series codes is expressed by "7 $(=2^3-1)$."

The values a1 to a3 of the respective registers of the shift register 20 which constitutes the M series code generator 22 are inputted to a binary/decimal converting circuit 23. The binary/decimal converting circuit 23 is a circuit for converting binary M series codes composed of three bits into a decimal M series code and serves to input the values a1 to a3 outputted from the shift register 20 respectively to a data converting circuit 24.

Since the inputted values a1 to a3 respectively show the digit of 22, 21 and 20, the data converting circuit 24 performs a computation expressed by the following Equation.

$$b1 = a1 \cdot 2^2$$
$$b2 = a2 \cdot 2^1$$
$$b3 = a3 \cdot 2^0 \qquad (2)$$

Thus, the values a1 to a3 are respectively converted into decimal numbers b1 to b3 and these values are outputted to an addition circuit 25. The addition circuit 25 adds these values b1 to b3 according to the following Equation (3), so that the addition circuit 25 converts the M series codes of three bits represented by the values a1 to a3 into a decimal M series code c1 and outputs it to a logical channel control circuit 26.

$$c1 = b1 + b2 + b3 \qquad (3)$$

Turning now to FIG. 10, the M series codes of three bits composed of the values a1 to a3 and the M series code c1 obtained by converting the M series codes into a decimal number will be described in more detail. The channel control part 5A is designed to set values a1=a2=0 and a3=1 to the shift register 20 of the M series code generator 22 as initial values. That is to say, the initial values of the M series codes are set to values (0, 0, 1). The initial values of the M series codes are converted into the values of decimal numbers by the binary/decimal converting circuit 23 as mentioned above, so that "1" is obtained as the M series code c1.

The M series code generator 22 obtains the exclusive OR of the value a1 of the first stage register and the value a3 of the third register and inputs it to the first stage register. Therefore, in a next state, a value "1" is inputted to the first stage register and the values "0" of the first and second stage registers are inputted to the second and third stage registers. Consequently, in a next state, the M series codes of three bits composed of a1=1 and a2=a3=0 are obtained. The M series codes thus obtained are converted into a decimal number to have a value "4" as an M series code c1.

Thus, such processes are successively repeated, hence an M series code c1 having a cycle 7 composed of 1, 4, 6, 7, 3, 5, 2, 1, . . . can be obtained in the channel control part 5A.

Figures 11, 12:
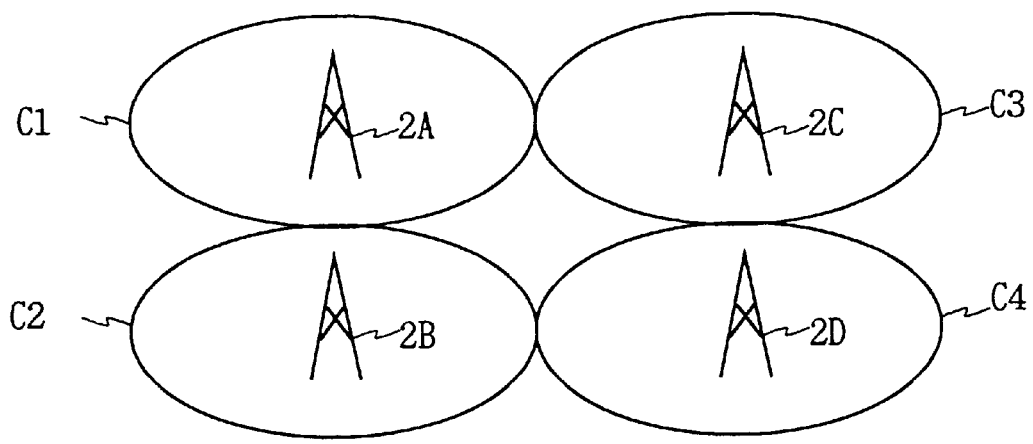
FIG. 11 is a chart employed for explaining the assignment of frequency channels to logical channels.
FIG. 12 is a schematic diagrammatic view employed for explaining the configuration of the cells of the cellular radiocommunication system.

The logical channel control part 26 uses the values of the M series codes c1 as the channel numbers of seven frequency channels f1 to f7 and assigns successively the frequency channels f1 to f7 to logical channels #1 to #7. In this case, as shown in FIG. 11, the logical channel control circuit 26 uses directly the values "1, 4, 6, 7, 3, 5, 2, 1, ..." of the M series codes c1 relative to the logical channel #1 as the channel numbers so that it assigns successively the frequency channels in a regular order of "f1, f4, f6, f7, f3, f5, f2, f1, ..." to the logical channel #1. Further, the logical channel control circuit 26 obtains a code string of "4, 6, 7, 3, 5, 2, 1, 4, ..." whose phase advances by one from that of the M series code c1 relative to the logical channels #2 and uses the code string as the channel numbers so that it successively assigns the frequency channels in a regular order of "f4, f6, f7, f3, f5, f2, f1, f4, ..." to the logical channel #2.

Similarly, the logical channel control circuit 26 obtains respectively code strings "6, 7, 3, 5, 2, 1, 4, 6, ..., " "7, 3, 5, 2, 1, 4, 6, 7, ..., " "3, 5, 2, 1, 4, 6, 7, 3, ..., " "5, 2, 1, 4, 6, 7, 3, 5, ..." and "2, 1, 4, 6, 7, 3, 5, 2, ..." the phases of which are respectively advanced one by one from the phase of the M series code c1. The logical channel control circuit uses these code strings as the channel numbers so that it assigns respectively the frequency channels successively in a regular order of "f6, f7, f3, f5, f2, f1, f4, f6, ..., " "f7, f3, f5, f2, f1, f4, f6, f7, ..., " "f3, f5, f2, f1, f4, f6, f7, f3, ..., " "f5, f2, f1, f4, f6, f7, f3, f5, ..." and "f2, f1, f4, f6, f7, f3, f5, f2, ..." to the logical channels #3 to #7.

As mentioned above, the logical channel control circuit 26 uses the values of the M series codes c1 as the channel numbers and assigns the frequency channels f1 to f7 to the logical channels #1 to #7 so that it forms the logical channels #1 to #7 based on a frequency hopping scheme. Then, the logical channel control circuit 26 assigns one of the logical channels #1 to #7 formed in such a manner to a communication with the communication terminal unit 3 and informs sequentially the transmitting circuit 13 of the channel numbers of the frequency channels f1 to f7 forming the logical channel which is assigned to the communication as channel information S5.

In this connection, since the number of the logical channels #1 to #7 are seven as a whole in this case, the base station 2 can communicate simultaneously with seven communication terminal units 3 at maximum. In that case, one of the logical channels #1 to #7 is assigned respectively to the seven communications so that the seven communications can be carried out at the same time.

In the meantime, in the cellular radiocommunication system, an area for providing a communication service is divided into a plurality of cells C1 to C4 as shown in FIG. 12. Base stations 2A to 2D having constitutions as described above are respectively installed in the plurality of cells C1 to C4. In each of the base stations 2A to 2D, the frequency channels f1 to f7 are assigned to the logical channels #1 to #7 in accordance with the above mentioned channel assignment method. In that instance, if the frequency channels f1 to f7 are assigned to the logical channels based on the completely same channel assignment method between the respective base stations, the frequency channels assigned to a logical channel #1A set to the first base station 2A will completely coincide with those assigned to a logical channel #1B set to the second base station 2B, so that there may be always generated the same channel interference between the base station 2A and the base station 2B.

For avoiding this problem in practice, in the channel control part 5A, a shift register control signal S15 is outputted to the shift register 20 from the logical channel control circuit 26 SO that the data shift quantity of the shift register 20 can be controlled. Thus, the values of the M series codes c1 generated by changing the data shift quantity of the shift register 20 for each base station are changed for each base station and the frequency channels f1 to f7 assigned to the logical channels #1 to #7 are changed for each base station.

Figures 13, 14:
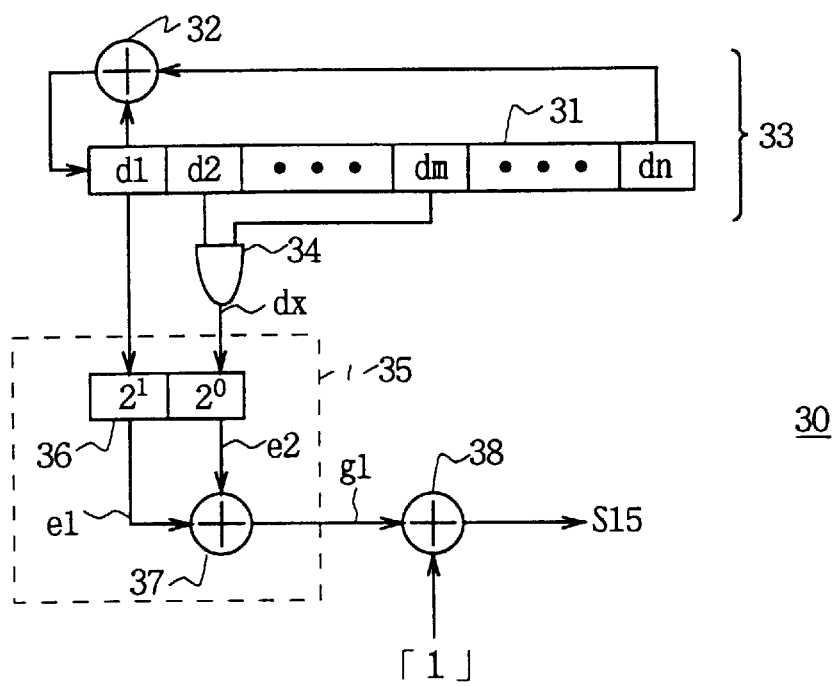
FIG. 13 is a block diagram showing the configuration of a shift quantity control circuit provided in a logical channel control circuit.
FIG. 14 is a schematic diagrammatic view showing a state when the frequency channels assigned to the logical channels are represented on a frequency axis.

Specifically, the logical channel control circuit 26 is provided with a shift quantity control circuit 30 as shown in FIG. 13 therein and outputs an output value outputted from the shift quantity control circuit 30 as the shift quantity control signal S15 so that the data shift quantity in the shift register 20 can be controlled.

The shift quantity control circuit 30 has an M series code generator 33 having an n-stage shift register 31 and an exclusive OR circuit 32. The M series code generator 33 performs an exclusive OR computation of the value of a first stage register and the value of a n-th stage register and inputs sequentially the computation result to the first stage register. Thus, the M series codes of n bits composed of values d1 to dn are generated. In this connection, assuming that the number of stages n of the shift register 31 is, for instance, approximately 21 in the M series code generator 33, the M series code having a relatively long cycle such as (2n−1) is generated.

Here, the values d2 and dm of the second and m-th stage registers of the shift register 31 are inputted to an AND circuit 34 so that the AND dx of the values d2 and dm is obtained. The value dx obtained by the AND circuit 34 is inputted together with the value d1 of the first stage register of the shift register 31 to a binary/decimal converting circuit 35. The binary/decimal converting circuit 35 is a circuit for converting the data of two bits composed of (d1, dx) into a decimal number and comprises a data converting circuit 36 and an addition circuit 37.

The data converting circuit 36 carries out a computation shown by the following Equation based on the values d1 and dx to calculate values e1 and e2.

$$e1 = d1.2^1$$

$$e2 = dx.2^0 \qquad (4)$$

In addition, the addition circuit 37 adds the value e1 to the value e2 as shown by the following Equation (5) so that it converts the codes of two bits composed of the values d1 and dx into the code g1 of a decimal number.

$$g1 = e1 + e2 \qquad (5)$$

Thus, a value "1" is added to the code g1 through an addition circuit 38 and the addition result is outputted as the shift quantity control signal S15. In this instance, values "1" to "4" are obtained as the addition result under an addition process in the addition circuit 38. When the value "4" is obtained, it is outputted as a value "0." Therefore, the shift quantity control signal 815 composed of the values "1" to "3" is outputted from the addition circuit 38.

The above mentioned shift quantity control circuit 30 is provided for each base station and the same M series codes composed of n bits composed of (d1, d2, . . . , dn) are respectively generated by the M series code generators 33. However, initial values set to the shift registers 31 of the M series code generators 33 differ between the base stations to generate the same M series codes whose phases are respectively changed, hence the data shift quantity outputted as the shift quantity control signal S15 also differs between the base stations. Accordingly, such shift quantity control circuits 30 are provided in the respective base stations so that the data shift quantity of the shift register 20 of the channel control part 5A is changed for each base station. Thus, the values of the M series codes c1 can be changed for each base station, so that the frequency channels f1 to f7 assigned to the logical channels #1 to #7 can be changed for each base station.

Besides, also in the communication terminal unit 3 which communicates with the base station 2, a channel control part 8A having a configuration similar to that of the channel control part 5A is provided. In the channel control part 8A, the same logical channels #1 to #7 as those of the base station 2 are formed in accordance with the similar channel assignment method and the channel control part 8A sequentially informs the receiving circuit 16 of the frequency channels forming the logical channel used for transmission by the base station 2.

(1-3) Operation and Effects

In the channel control part 5A with the above mentioned configuration, the M series codes of three bits generated by the M series code generator 22 are converted into the M series codes c1 of decimal number by the binary/decimal converting circuit 23. The values of the M series codes c1 are used as the channel numbers and the frequency channels f1 to f7 are sequentially assigned to the logical channels #1 to #7 based on the channel hopping mode, as shown in FIG. 11. At that time, in the channel control part 5A, the phases of the M series code c1 are advanced one by one for each logical channel, so that the phases of the frequency channels f1 to f7 assigned to the logical channels #1 to #7 are shifted one by one. When the logical channels #1 to #7 are formed by such a channel assignment method, the same logical channels can be prevented from being always located at adjacent positions on a frequency axis.

Now, this matter will be more specifically described by referring to FIG. 14. When the channel assignment illustrated in FIG. 11 is expressed again by showing frequency channels on the abscissa axis, it can be changed to that as shown in FIG. 14. As readily understood from FIG. 14, for instance, the logical channels #5 and #6 are located at positions adjacent to the logical channel #2 in a time slot T0, the logical channels #5 and #3 are adjacent to the logical channel #2 in a time slot T1, the logical channel #1 is adjacent to the logical channel #2 in a time slot T2, the logical channels #4 and #6 are adjacent thereto in a time slot T3, the logical channels #5 and #6 are adjacent thereto in a time slot T4, the logical channels #3 and #7 are adjacent thereto in a time slot T5 and the logical channel #1 is adjacent to the logical channel #2 in a time slot 6, respectively. Therefore, the same logical channels can be prevented from being always located at adjacent positions to the logical channel #2 on the frequency axis.

As stated above, in the channel control part 5A, the phases of the M series codes c1 are advanced one by one so that the phases of the frequency channels f1 to f7 assigned to the logical channels #1 to #7 are shifted one by one, hence the same logical channels can be prevented from being always located at the adjacent positions on the frequency axis. Accordingly, the logical channels located at the adjacent positions are sequentially changed, an adjacent channel interference at a always similar level can be prevented from being generated and the adjacent channel interference can be averaged.

Further, in the channel control part 5A, the data shift quantity of the shift register 20 which constitutes the M series code generator 22 is changed for each base station, and therefore, the M series codes c1 generated can be changed for each base station. Consequently, the frequency channels f1 to f7 assigned to the logical channels #1 to #7 can be changed for each base station and the same channel interference can be prevented from being always generated between the base stations.

According to the above mentioned configuration, since the phases of the frequency channels f1 to f7 assigned to the logical channels #1 to #7 are shifted by advancing the phases of the M series codes c1 one by one, the same logical channels can be avoided from being always adjacent to each other on the frequency axis and the adjacent channel interference can be averaged.

(2) Second Embodiment

In the above first embodiment, although an explanation is directed to an example in which one of the logical channels #1 to #7 generated is fixedly assigned to the communication with an arbitrary communication terminal unit 3, logical channels #1 to #7 which are assigned to a communication with a communication terminal unit 3 are further changed sequentially in terms of time according to a second embodiment, hence frequency channels used for the communication are further randomized.

For this purpose, according to the second embodiment, the logical channels #1 to #7 generated in the above described first embodiment are specified as logical subchannels and the logical subchannels #1 to #7 are combined together in terms of time so that logical channels ##1 to ##7 are formed. Then, one of the logical channels ##1 to ##7 is assigned to a communication with an arbitrary communication terminal unit 3.

Figure 15:
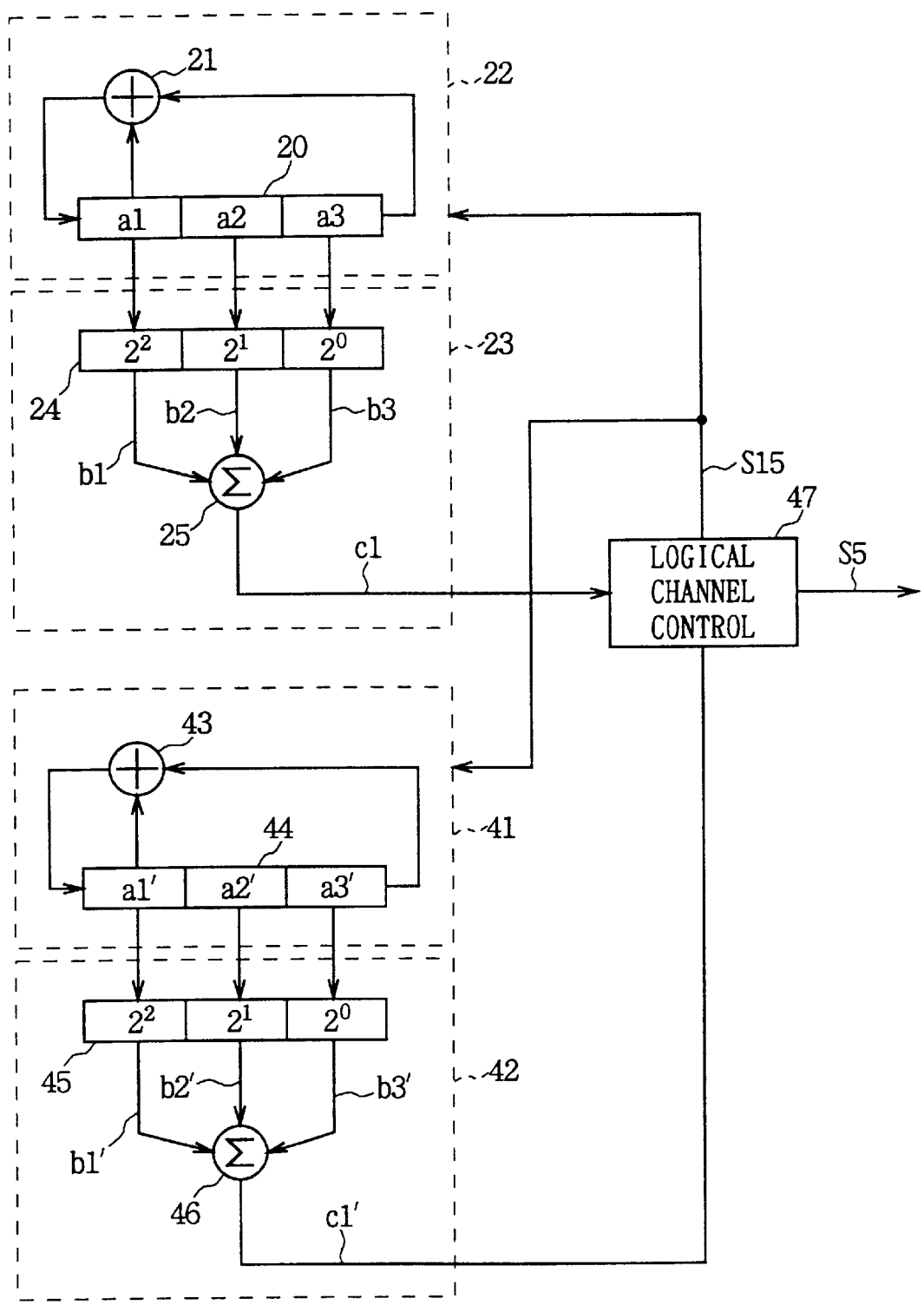
FIG. 15 is a block diagram showing the configuration of a channel control part according to a second embodiment.

The configuration of a channel control part for realizing the above described processes is shown in FIG. 15. In FIG. 15 in which parts corresponding to those in FIG. 9 are designated by the same reference numerals, 40 generally designates a channel control part according to the second embodiment. In the channel control part 40, an M series code generator 41 and a binary/decimal converting circuit 42 are newly provided in addition to the configuration of the first embodiment.

In this case, the M series code generator 41 comprises an exclusive OR circuit 43 and a three-stage shift register 44 and has fundamentally the same configuration as that of the M series code generator 22. Similarly, the binary/decimal converting circuit 42 comprises a data converting circuit 45 and an addition circuit 46 and has basically the same configuration as that of the binary/decimal converting circuit 23.

Figure 16A:
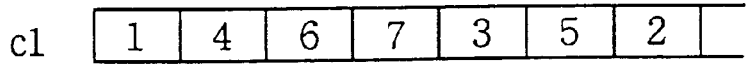
FIGS. 16A and 16B are schematic diagrammatic views showing the phases of two kinds of M series codes generated in the channel control part according to the second embodiment.
Figure 16B:
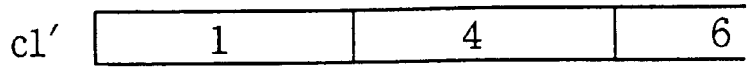

In this channel control part 40, however, the operating clock of the M series code generator 41 is set to 1/n times (for instance, here, n=3) as long as the operating clock of the M series code generator 22. Therefore, in the channel control part 40, although the value of the M series code c1 is equal to the value of an M series code c1', the code generating timing of the M series codes c1' is delayed by n times as long as that of the M series codes c1 as shown in FIG. 16.

A logical channel control circuit 47 uses the M series codes c1 in accordance with the channel assignment method explained in the above first embodiment and successively assigns frequency channels f1 to f7 to the secondary logical channels #1 to #7 to form the logical subchannels #1 to #7. Further, the logical channel control circuit 47 combines the logical subchannels #1 to #7 together based on the M series codes c1' to form the logical channels ##1 to ##7.

Specifically, the logical channel control circuit 47 employs the values of the M series codes c1' as the channel numbers of the logical subchannels #1 to #7 and assigns sequentially the logical subchannels #1 to #7 to the logical channels ##1 to ##7. In this instance, as shown in FIG. 17, the logical channel control circuit 47 directly uses the values "1, 4, 6, 7, 3, 5, 2, 1, . . . " of the M series codes c1' as logical subchannel numbers relative to the logical channel ##1 so that it assigns successively the logical subchannels in a order of "#1, #4, #6, #7, #3, #5, #2, #1, . . . " to the logical channel ##1. Further, the logical channel control circuit 47 obtains a code string "4, 6, 7, 3, 5, 2, 1, 4, . . . " whose phase is advanced by one from that of the M series codes c1 and uses this code string as the channel numbers of the logical subchannels relative to the logical channel ##2 so that it assigns successively the logical subchannels in a order of "#4, #6, #7, #3, #5, #2, #1, #4, . . . " to the logical channel ##2.

Similarly, the logical channel control circuit 47 obtains respectively code strings "6, 7, 3, 5, 2, 1, 4, 6, . . . ," "7, 3, 5, 2, 1, 4, 6, 7, . . . ," "3, 5, 2, 1, 4, 6, 7, 3, . . . ," "5, 2, 1, 4, 6, 7, 3, 5, . . . " and "2, 1, 4, 6, 7, 3, 5, 2, . . . " whose phases are advanced one by one from the phase of the M series codes c1', and uses these code strings respectively as the channel numbers of the secondary logical channels so that the logical channel control circuit 47 assigns sequentially the secondary channels in orders of "#6, #7, 3#, #5, #2, #1, #4, #6, . . . ," "#7, 3#, #5, #2, #1, #4, #6, #7, . . . ," "#3, #5, #2, #1, #4, #6, #7, #3, . . . " "#5, #2, #1, #4, #6, #7, #3, #5, . . . " and "#2, #1, #4, #6, #7, #3, #5, #2, . . . " respectively to the logical channels ##3 to ##7.

In this way, the logical channel control circuit 47 uses the values of the M series codes c1 as the logical subchannel numbers and assigns the logical subchannels #1 to #7 to the logical channels ##1 to ##7 to form the logical channels ##1 to ##7 obtained as a result of combining the logical subchannels #1 to #7 together. Then, the logical channel control circuit 47 assigns one of the logical channels ##1 to ##7 formed as described above to a communication with the communication terminal unit 3 and informs a transmitting circuit 13 of the channel numbers of the frequency channels f1 to f7 forming the logical channel assigned to the communication sequentially as channel information S5.

In this connection, since the code generating timing of the M series codes c1' is set to three times (namely, n=3) as long as that of the M series codes c1, one logical subchannel employs three time slots. Assuming that n is 1, the logical subchannels are naturally changed every time slot.

With the above mentioned configuration, the logical subchannels #1 to #7 are formed by the assignment of frequency channels f1 to f7 thereto based on the first M series codes c1 and the logical channels ##1 to ##7 by the assignment of the logical subchannels #1 to #7 thereto based on the second M series codes c1', and therefore, the frequency channels f1 to f7 to be assigned to the logical channels ##1 to ##7 can be more randomized and an adjacent channel interference can be more averaged.

(3) Third Embodiment

In the above first and second embodiments, while an explanation is given to the examples in which the channel assignment is carried out by using the M series codes generated by the M series code generator, according to a third embodiment, channel assignment tables in which the adjacent channel interference is equally distributed are previously provided and values looked up from the channel assignment tables are used to perform a channel assignment.

According to the third embodiment, logical channels are initially hierarchically represented by first and second logical subchannels and actual frequency channels are also hierarchically represented by first and second physical subchannels. For example, it is assumed that there exist 16 frequency channels f1 to f16 and 16 logical channels #1 to #16 are formed with the frequency channels f1 to f16 based on a frequency hopping scheme.

In this case, the logical channels #1 to #16 are noted by a hierarchical representation of (L1, L2) by using the first and second logical subchannels L1 and L2. More specifically, as shown in FIG. 18, the logical channels #1 to #16 are expressed respectively by (1, 1), (1, 2), (1,3), (1, 4), (2, 1), (2, 2), (2, 3), (2, 4), (3, 1), (3, 2), (3, 3), (3, 4), (4, 1), (4, 2), (4,3) and (4, 4). Therefore, if the logical subchannel (L1, L2) is designated as, for instance, (1, 1), the logical channel #1 will be designated. If the logical subchannel (L1, L2) is designated as, for instance, (2, 4), the logical channel #8 will be designated.

Further, the frequency channels f1 to f16 are noted by a hierarchical representation of [G1, G2] by using the first and second physical subchannels G1 and G2. More specifically, as shown in FIG. 19, the frequency channels f1 to f16 are expressed respectively by [1, 1], [1, 2], [1, 3], [1,4], [2, 1], [2, 2], [2, 3], [2, 4], [3, 1], [3, 2], [3, 3], [3, 4], [4, 1], [4, 2], [4, 3] and [4, 4]. Therefore, if the physical subchannel channel [G1, G2] is designated as, for instance, [1, 1], the frequency channel f1 will be designated. If the secondary physical channel [G1, G2] is designated as, for example, [2, 4], the frequency channel f8 will be designated.

The assignment of the logical channels and the frequency channels noted in such a manner is carried out by employing channel assignment tables TB1 and TB2 as shown in FIGS. 20A and 20B. In this case, the channel assignment table TB1 is a table for assigning the physical subchannels G1 to the logical subchannels L1. Numbers in the table indicate the numbers of the physical subchannels G1. Further, the channel assignment table TB2 is a table for assigning the physical subchannels G2 to the logical subchannels L2 and numbers in the table indicate the numbers of the physical subchannels G2.

The channel assignment tables TB1 and TB2 are created based on tertiary M series codes and are preset so as to uniformly distribute adjacent channels. For instance, as channels located at positions adjacent to the logical subchannel L1 (or L2) when it is 1, the logical subchannels L1 (or L2) of 2 to 4 may be considered. When all the indexes are tabulated, the frequency of occurrence that the logical subchannels L1 (or L2)=2 to 4 appear at positions adjacent to the logical subchannel L1 (or L2)=1 is twice for each of the logical subchannels.

In case the frequency channels are assigned to the logical channels by using the above described channel assignment tables TB1 and TB2, the values of random numbers generated in a prescribed random number generator are first looked up from the channel assignment tables TB1 and TB2 as index numbers. Then, the values obtained as a result are used as the channel numbers of the physical subchannels G1 and G2 and assigns the frequency channels to the logical channels.

For instance, it is assumed that the frequency channel is assigned to the logical channel #1. In this case, the logical channel #1 can be expressed by (L1, L2)=(1, 1) by using the logical subchannels L1 and L2. Assuming that a random number obtained by the random number generator is 0, the random number of the value 0 is used as an index number to look up the channel assignment tables TB1 and TB2. Then, the physical subchannel G1=4 is obtained relative to the logical subchannel L1=1 and the physical subchannel G2=4 is obtained relative to the logical subchannel L2=1, respectively. In other words, the physical subchannels (G1, G2)=(4, 4) are assigned to the logical subchannels (L1, L2)=(1, 1). In this case, since the physical subchannels (G1, G2)=(4, 4) represent the frequency channel f16, the frequency channel f16 is assigned to the logical channel #1.

Figures 21, 22:
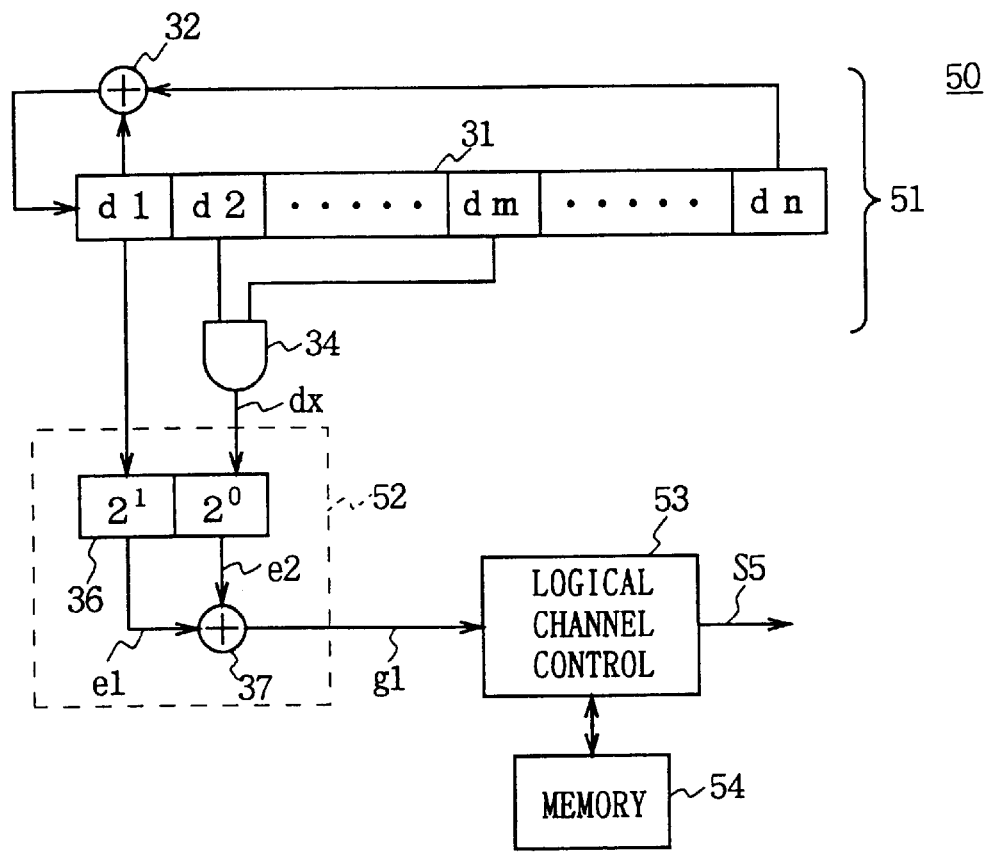
FIG. 21 is a block diagram showing the configuration of a channel control part according to the third embodiment.
FIG. 22 is a chart employed for explaining the assignment of the frequency channels to the logical channels according to the third embodiment.

A channel control part for carrying out the above mentioned channel assignment is illustrated in FIG. 21. Referring to FIG. 21, reference numeral 50 generally designates a channel control part according to the third embodiment. The channel control part comprises a random number generator having an M series code generator 51 and a binary/decimal converting circuit 52, a logical channel control circuit 53 and a memory 54 in which the channel assignment tables TB1 and TB2 are stored. The M series code generator 51 and the binary/decimal converting circuit 52 forming the random number generator have configurations similar to those of the M series code generator 33 and the binary/decimal converting circuit 35 which are shown in FIG. 13, generate codes composed of values of 0, 1, 2 or 3 and transmit the codes to the logical channel control circuit 53.

The logical channel control circuit 53 employs the values of the codes g1 as the index numbers of the channel assignment tables TB1 and TB2. Then, the logical channel control circuit looks up the channel assignment tables TB1 and TB2 stored in the memory 54 based on the index numbers, uses the values looked up from the tables as the values of the physical subchannels G1 and G2 and assigns the frequency channels f1 to f16 represented by the secondary physical channels (G1, G2) respectively to the logical channels #1 to #16. Thus, the logical channel control circuit 53 assigns any one of the logical channels #1 to #16 formed as described above to a communication with a communication terminal unit 3. Then, the channel control circuit sequentially informs a transmitting circuit 13 of the channel numbers of the frequency channels forming the logical channels to which they are assigned as channel information S5.

FIG. 22 shows an example in which the frequency channels are assigned to the logical channels #1 to #16 by the above mentioned channel assignment method. In this example, initially, it is assumed that the code g1 of a value 0 is generated by the random number generator. When the channel assignment tables TB1 and TB2 are looked up by using the value 0 as an index number, the physical subchannels G1=4, 1, 2 and 3 are assigned respectively to the logical subchannels L1=1, 2, 3 and 4, and the physical subchannels G2=4, 1, 2 and 3 are assigned respectively to the logical subchannels L2=1, 2, 3 and 4. Therefore, as shown in FIG. 22, the frequency channels f16, f13, f14, f15, f4, f1, f2, f3, f8, f5, f6, f7, f12, f9, f10 and f11 are sequentially assigned to the logical channels #1 to #16, respectively. Thus, in the logical channel control circuit 53, the channel assignment tables TB1 and TB2 are looked up based on the values of the codes g1 in accordance with the above described method, hence the frequency channels f1 to f16 are assigned respectively to the logical channels #1 to #16.

In the meantime, transmitted data to be transmitted in the cellular radio-communication system includes not only low speed data such as audio data but also high speed data such as image data, etc. in recent years. When the low speed data is transmitted, any one of the above mentioned frequency channels f1 to f16 is used so that the low speed data can be transmitted. When the high speed data is transmitted, it cannot be transmitted by using only a single frequency channel. This can be said, because a bandwidth required for a frequency channel depends on the data speed of the transmitted data. Therefore, when the high speed data is transmitted, successive frequency channels, for instance, four frequency channels or so, are assigned to the transmission.

In case of logical channels for transmitting such high speed data, according to the third embodiment, the logical channel essentially comprising the logical subchannels L1 and L2 is formed only with an upper logical subchannel L1 and the physical subchannel G1 is assigned only to the logical subchannel L1. In this case, since a group composed of four successive frequency channels is designated as the physical subchannel G1, if only the physical subchannel G1 is assigned to the logical subchannel, the four successive frequency channels can be assigned to the logical subchannel at the same time.

Now, a case will be considered in which for example, 12 channels for transmitting the low speed data are formed by the logical channels #1 to #12 and one channel for transmitting the high speed data is formed by the logical channels #13 to #16. In this case, the logical channels #1 to #12 are respectively formed with the logical subchannels L1 and L2 in the same manner as usual and the logical channels #13 to #16 are respectively formed only with the secondary logical channel L1. When the logical channels are formed as mentioned above, one frequency channel is assigned to each of the logical channels #1 to #12, because the physical subchannels G1 and G2 are assigned to the logical channels #1 to #12, and the four successive frequency channels are assigned to the logical channels #13 to #16, because only the physical subchannel G1 is assigned to the logical channels #13 to #16. Thus, one channel composed of these four frequency channels is formed.

FIG. 23 shows an example in which the above described channel assignment is performed. In this example, it is initially assumed that a code g1 of value 0 is generated by the random number generator. When this value 0 is used as an index number to look up the channel assignment tables TB1 and TB2, the physical subchannels G1=4, 1, 2 and 3 are assigned respectively to the logical subchannels L1=1, 2, 3 and 4 and the physical subchannels G2=4, 1, 2 and 3 are assigned respectively to the logical subchannels L2=1, 2, 3 and 4. Therefore, as shown in FIG. 23, the frequency channels f16, f13, f14, f15, f4, f1, f2, f3, f8, f5, f6 and f7 are assigned respectively to the logical channels #1 to #12. On the other hand, since only the physical subchannel G1=3 is assigned to the logical channels #13 to #16 which are expressed merely by the logical subchannel L1, the four frequency channels f9 to f12 are assigned to the logical channels #13 to #16.

As mentioned above, since, in the channel control part, the logical channels and the physical channels are hierarchically configured, if the high speed data is transmitted, the logical channels may be formed only with the upper logical subchannel L1. Thus, only the physical subchannel G1 can be assigned to the logical subchannel L1, hence a channel for transmitting the high speed data composed of a plurality of frequency channels can be formed with ease.

When the channel for transmitting the high speed data is formed in accordance with the above described channel assignment method, the channel for transmitting the high speed data may be occasionally assigned to the edge of a system band (called simply an edge, hereinafter) prepared for a radiocommunication between the base station 2 and the communication terminal unit 3. For instance, when channels at the time of the logical subchannel L1=4 are designated as a channel for transmitting high speed data, as mentioned above, the physical subchannel G1=4 is assigned to the logical subchannel L1 (see FIGS. 20A and 20B) when the value of a code g1 is 3. Consequently, as illustrated in FIG. 24A, the frequency channels f13 to f16 located at the edge of the system band are assigned to the channel for transmitting the high speed data.

When the channel for transmitting the high speed data is assigned to the edge of the system band (f1 to F16) in such a manner, the high speed data is sent through the channel for transmitting the high speed data. Thus, unnecessary radiation radiated to parts outside the system band is increased. As a result of the unnecessary radiation, guard bands located at both ends of the system band need to be enlarged.

Therefore, in the channel control part 50, when the channel for transmitting the high speed data is formed, the field of the logical subchannels designated as the channel for transmitting the high speed data in the channel assignment table TB1 is previously corrected, so that the channel for transmitting the high speed data is prevented from being assigned to the edge of the system band. More specifically, for instance, if the channels at the time of the logical subchannel L1=4 are designated as the channel for transmitting the high speed data, in a similar manner to that of the above described example, parts corresponding to the logical subchannel L1=4 in index numbers of 1 and 3 will be assigned to the edges of the system band as shown in FIG. 25. Therefore, the channel numbers corresponding to the parts are replaced by those corresponding to the logical subchannel L1=2. In such a manner, if the contents of data in the channel assignment table TB1 are corrected previously, even when the index number is 3, 3 is assigned as the physical subchannel G1. Accordingly, as shown in FIG. 24B, the frequency channels f9 to f12 are assigned to the channel for transmitting the high speed data, hence the channel for transmitting the high speed data can be prevented from being assigned to the edge of the system band. Consequently, the width of the guard bands which are previously created at both ends of the system band can be decreased.

As described in the third embodiment, when the channel assignment tables TB1 and TB2 are previously provided, and the channel assignment tables TB1 and TB2 are referred to assign the frequency channels f1 to f16 as the physical channels, the same channel assignment tables TB1 and TB2 are also provided in the channel control part 8A of the communication terminal unit 3 in the receiving side, so that the channel control part 8 can grasp the channels whose transmitting signals are sent from the base station 2 by referring to the channel assignment tables TB1 and TB2.

Therefore, as mentioned above, when the contents of the data of the channel assignment table TB1 are corrected, information indicating the corrected parts are sent to the communication terminal unit 3 through a prescribed channel exclusively used for control. When this information is received by the communication terminal unit, the channel control part 8A of the communication terminal unit 3 also corrects the corresponding parts of the channel assignment table TB1. Thus, even when the contents of the data of the channel assignment table TB1 are corrected in order to prevent the channel for transmitting the high speed data from being assigned to the edge of the system band, the receiving side can be prevented from erroneously receiving channels to be corrected.

With the above stated configuration according to the third embodiment, the channel assignment tables TB1 and TB2 in which the adjacent channel interference is equally distributed are previously provided. Then, the channel assignment tables TB1 and TB2 are referred to based on the values of the codes g1 generated by the random number generators (51 and 52) so that the frequency channels f1 to f16 as the physical channels to the logical channels #1 to #16 based on a frequency hopping scheme. In such a way, since the channel assignment tables TB1 and TB2 in which the adjacent channel interference is uniformly distributed are prepared and the frequency channels f1 to f16 are assigned to the logical channels by referring to the channel assignment tables, the same logical channels can be prevented from being always located at adjacent positions on a frequency axis and the adjacent channel interference can be averaged with the relatively simple configuration according to the third embodiment.

Further, according to the third embodiment, the logical channels #1 to #16 are represented by the hierarchical logical subchannels L1 and L2 and the frequency channels f1 to f16 are represented by the hierarchical physical subchannels G1 an G2. Then, the channel assignment table TB1 is referred to thus assign the upper physical subchannels G1 to the logical subchannels L1 and the channel assignment table TB2 is referred to thus assign the lower secondary physical channels G2 to the secondary logical channels L2, so that the frequency channels f1 to f16 are assigned to the logical channels #1 to #16. Thus, when the channel for transmitting the high speed data is formed, the upper physical subchannel G1 is only assigned to the logical subchannel L1 so that the channel for transmitting the high speed data can be formed. Consequently, the channel for transmitting the high speed data and the channel for transmitting low speed data can be systematically controlled.

Further, according to the third embodiment, when the channel for transmitting the high speed data is formed, the parts in the channel assignment table TB1 which correspond to the channel for transmitting the high speed data assigned to the edge of the system band are previously modified, hence the channel for transmitting the high speed data can be prevented from being assigned to the edge of the system band. Accordingly, the guard bands previously formed at both ends of the system band can be narrowed.

With the above configuration, the channel assignment tables TB1 and TB2 in which the adjacent channel interference is equally distributed are previously provided and the channel assignment tables TB1 and TB2 are referred to based on the values of the codes g1 generated by the random number generators (51 and 52) so that the frequency channels f1 to f16 as the physical channels are assigned to the logical channels #1 to #16 based on the frequency hopping scheme. Therefore, the same logical channels can be prevented from being always located at adjacent positions on a frequency axis and the adjacent channel interference can be averaged by the relatively simple configuration.

(4) Other Embodiments

According to the above first embodiment, although the initial values set to the M series code generator 33 are changed for each base station to generate the shift register control signals S15 different between the base stations and the different frequency channels are assigned to the logical channels for each of the base stations, needless to say, the present invention is not limited thereto, and data can be fetched from the different taps of the shift register 31 of the M series code generator 33 and inputted to the AND circuit 34 so that the shift register control signals S15 different between the base stations can be formed and similar effects to those mentioned above can be obtained.

Further, according to the above described first embodiment, although the frequency channels f1 to f7 are assigned respectively to the logical channels #1 to #7 based on code strings obtained by advancing the phases of the generated M series codes c1 one by one, it should be noted that the present invention is not limited thereto, and the phases of the N series codes c1 can be delayed one by one.

Still further, according to the above third embodiment, quaternary channel assignment tables TB1 and TB2 in which the logical subchannels L1 and L2 together with the index numbers are 4 are combined with each other so that each of the frequency channels f1 to f16 is assigned respectively to each of the logical channels #1 to #16, needless to say, the present invention is not limited thereto, and a plurality of channels assignment tables such as a secondary, a tertiary, a seventh, an eighth, a fifteenth tables as shown in FIGS. 26 to 30 can be prepared, and these assignment tables can be properly combined together depending on the number of frequency channels so that each of the frequency channels is assigned respectively to each of the logical channels with the similar effects as those mentioned above.

In this connection, assuming that the number of order of the channel assignment table is N, if N is expressed by N=2M−1 (here, M=0, 1, 2, . . . ) the channel assignment table can be created by arranging the N-th M series codes whose phases are shifted one by one, and if N is expressed by N=2M, the channel assignment table can be created by inserting one code into a prescribed position of the N-th M series codes and arranging the code string whose phases are shifted one by one.

Still further, according to the above third embodiment, although the values of the codes g1 generated by the random number generators (51 and 52) are used as the index numbers and the channel assignment tables TB1 and TB2 are looked up, the present invention is not limited thereto, and smaller index numbers can be simply looked up sequentially in order so that the same effects as those in the third embodiment can be obtained. Further, the logical channels formed by looking up the channel assignment tables may be suitably combined in terms of time as in the second embodiment to employ them finally as the logical channels so that the similar effects to those acquired in the third embodiment can be realized.

Furthermore, according to the above embodiments, although the M series codes are generated in the channel control parts 5A, 40 or 50, and the M series codes are used to perform the channel assignment, it should be recognized that the present invention is not limited thereto, and gold codes or other codes formed by combination of the M series codes can be employed. In short, when the pseudo-noise codes whose code strings seem random are used, the similar effects to those described above can be achieved.

As described above, according to the present invention, using the values of the first pseudo-noise codes as the channel numbers and assigning the physical channels to the first logical channels, obtaining second pseudo-noise codes whose phases are shifted from those of the first pseudo-noise codes, and using the values of the second pseudo-noise codes as the channel numbers and assigning the physical channels to the second logical channels, the first and second logical channels can be prevented from being always adjacent to each other on the frequency axis, so that the adjacent channel interference can be made averaged.

Furthermore, by preparing a channel assignment table on which an interference with adjacent channels is uniformly distributed, and using values looked up from the channel assignment table as the channel numbers of the physical channels and assigning the physical channels respectively to the plurality of logical channels, the same logical channels can be prevented from being always located at adjacent positions on the frequency axis so that the adjacent channel interference can be made averaged with a relatively simple configuration.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A physical channel assignment method for forming logical channels based on frequency hopping by sequentially combining physical channels composed of frequency channels in terms of time, said method comprising the steps of:

generating first pseudo-noise codes having a prescribed cycle;

using values of the first pseudo-noise codes as channel numbers of the physical channels and assigning said physical channels to first logical channels;

obtaining second pseudo-noise codes whose phases are shifted from phases of the first pseudo-noise codes;

using values of the second pseudo-noise codes as the channel numbers of the physical channels and assigning the physical channels to second logical channels; and forming a third logical channel by combining said first logical channel with said second logical channel in terms of time.

2. A physical channel assignment method for forming logical channels based on frequency hopping by sequentially combining physical channels composed of frequency channels in terms of time, said method comprising the steps of:

preparing a channel assignment table on which an interference with adjacent channels is uniformly distributed;

using values looked up from the channel assignment table as channel numbers of physical channels and assigning the physical channels respectively to a plurality of logical channels;

expressing hierarchically said logical channels by a plurality of logical subchannels;

expressing hierarchically said physical channels by a plurality of physical subchannels;

controlling hierarchically a corresponding relationship between the logical subchannels and the physical subchannels by the channel assignment table;

looking up said channel assignment table based on values of generated prescribed random numbers; and assigning the physical subchannels respectively corresponding to logical subchannels thereto, so that the physical channels are assigned respectively to the plurality of logical channels.

3. The physical channel assignment method according to claim 2, wherein a plurality of successive physical channels are assigned to the logical channels by assigning upper physical subchannels only to upper logical subchannels, so that channels for transmitting high speed data are formed.

4. The physical channel assignment method according to claim 3, wherein parts corresponding to the channels for transmitting the high speed data are previously corrected in the channel assignment table, so that the channels for transmitting the high speed data are not assigned to an edge of a system frequency band.

5. The physical channel assignment method according to claim 4, wherein a receiving side is informed of the previously corrected parts when the channel assignment table is corrected.

6. A transmitter for forming logical channels based on frequency hopping by sequentially combining physical channels composed of frequency channels in terms of time and transmitting a transmitting signal through the logical channels, said transmitter comprising:

a channel controller for preparing a channel assignment table on which interference with adjacent channels is uniformly distributed, for using values looked up from the channel assignment table as channel numbers of physical channels and for assigning the physical channels respectively to a plurality of logical channels; and transmitting means for receiving channel information from the channel controller and transmitting a transmitting signal through a desired logical channel of the plurality of logical channels, wherein said channel controller expresses hierarchically said logical channels by a plurality of logical subchannels, expresses hierarchically said physical channels by a plurality of physical subchannels, controls hierarchically a corresponding relationship between the logical subchannels and the physical subchannels by the channel assignment table, makes reference to said channel assignment table based on values of generated prescribed random numbers and assigns the physical subchannels respectively corresponding to logical subchannels thereto, so that the physical channels are assigned respectively to the plurality of logical channels.

7. The transmitter according to claim 6, wherein said channel controller assigns upper physical subchannels only to upper logical subchannels, so that said channel controller assigns a plurality of successive physical channels to the logical channels to form channels for transmitting high speed data.

8. The transmitter according to claim 7, wherein said channel controller previously corrects parts corresponding to the channels for transmitting the high speed data in the channel assignment table, so that the channels for transmitting the high speed data are not assigned to an edge of a system frequency band.

9. The transmitter according to claim 8, wherein said channel controller informs a receiving side of information indicating the previously corrected parts through said transmitting means when the channel controller corrects the channel assignment table.

\* \* \* \* \*